United States Patent Office 3,302,404
Patented Feb. 7, 1967

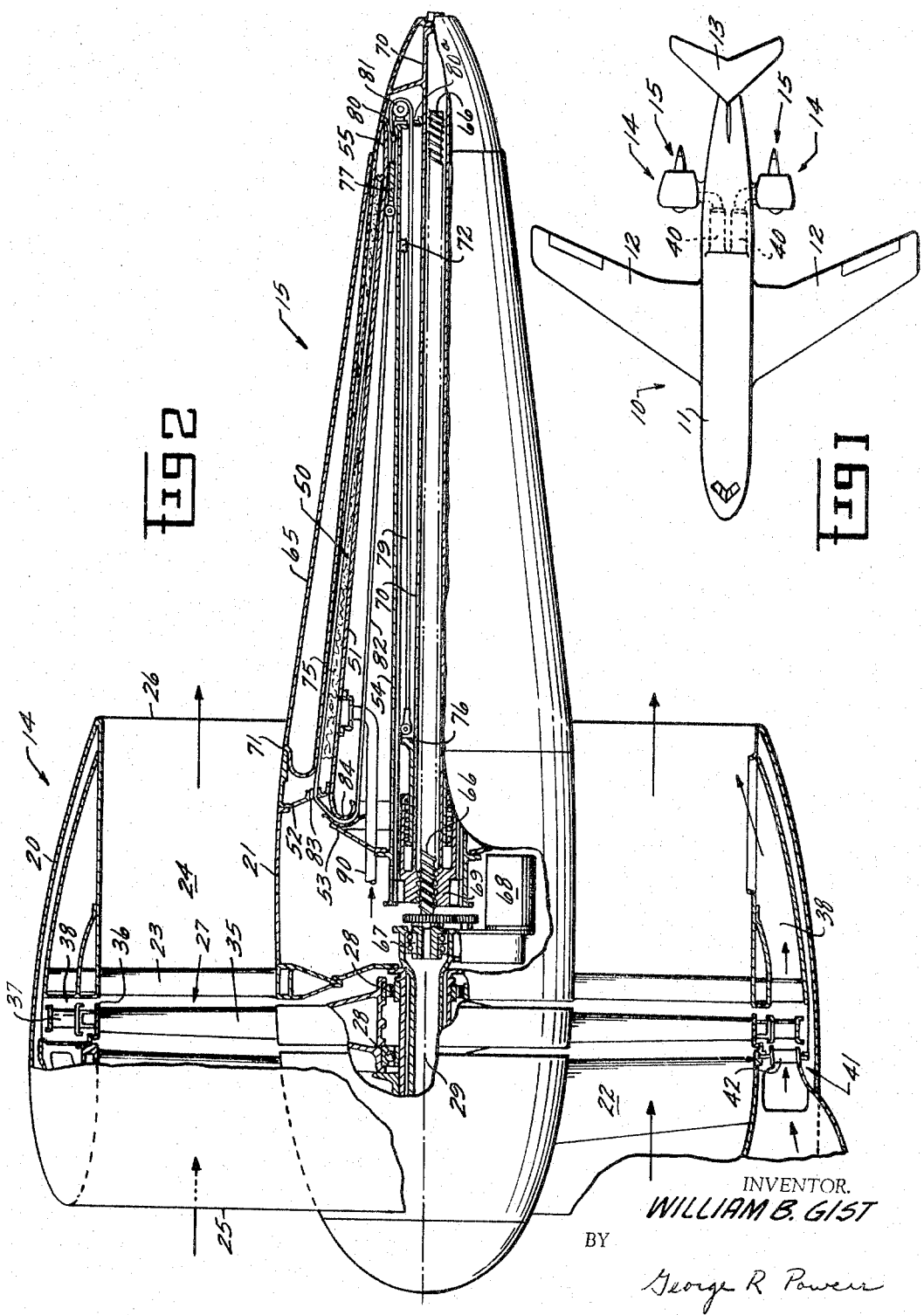

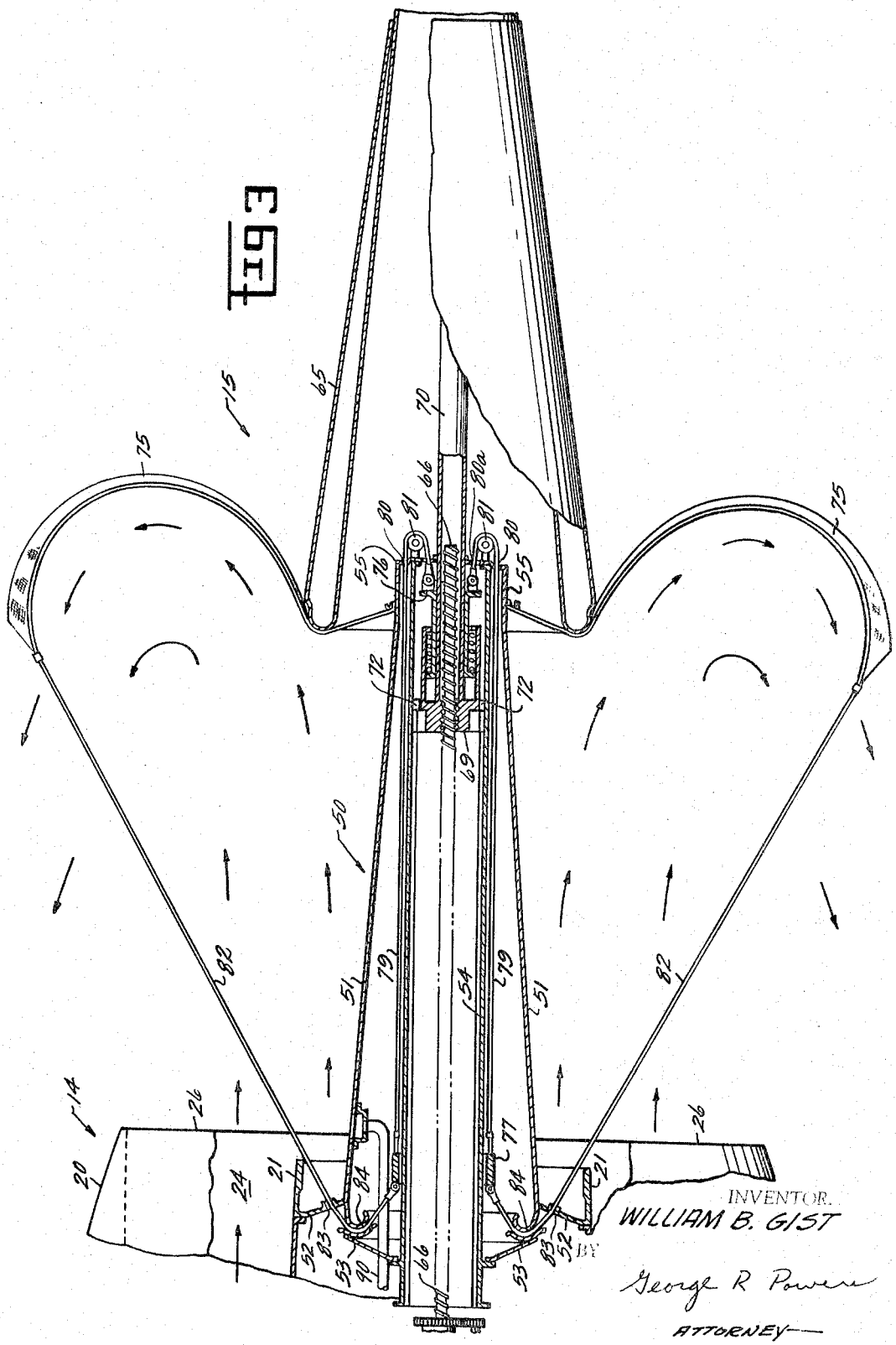

3,302,404
LIGHTWEIGHT THRUST REVERSER
William Bruce Gist, Jr., Lynnfield, Mass., assignor to General Electric Company, a corporation of New York
Filed June 30, 1965, Ser. No. 468,341
5 Claims. (Cl. 60—230)

This invention relates to thrust reversers and, more particularly, to lightweight thrust reversing means especially suited for use with jet propulsion units of the fan or high bypass ratio type.

In jet propelled aircraft, it is extremely desirable that effective and dependable means be provided for reversing the propulsion stream under certain conditions to thereby produce reverse thrust on the aircraft. During landing, thrust reversing may be used to bring the aircraft to a rapid halt without requiring the use of mechanical braking systems. Similarly, a take-off may be aborted at the last possible moment and the aircraft brought to a quick and safe stop through the use of thrust reversers. There are several obvious advantages in the use of thrust reversers. First of all, an effective thrust reverser acting in conjunction with the aircraft braking system can stop an aircraft in a much shorter distance than even the most effective mechanical braking arrangements acting alone; consequently, the aircraft may operate from much shorter runways. The use of thrust reversers thus extends the operational capability of both the aircraft and existing airfields as well as permitting the construction of new runways of minimum length at great savings in expense, time and effort. Secondly, thrust reversers, which typically have essentially static components for reversing the jet stream, do not rely on the frictional dissipation of great quantities of energy for bringing the aircraft to a stop. As a result, the use of thrust reversers extends the operating life of certain aircraft components such as brake linings and tires.

With the modern trend in aircraft design toward larger and heavier aircraft, the need for effective thrust reversing is assuming ever increasing importance. This growing need is complicated, however, by another design trend relating to physical size of aircraft powerplants. More particularly, to provide the extremely high thrust required to propel large aircraft, various fan and high bypass ratio powerplants are being proposed and used. This type of powerplant, which extracts a portion of the energy present in the hot gas stream for accelerating a large volume of bypass air, is characterized by a relatively large jet stream diameter and relatively cool jet gases. The enlarging of state-of-the-art reversers for use on such powerplants may not be entirely satisfactory since the weight of such a thrust reverser will ordinarily increase at greater rate than its diameter as it is scaled up in size. Furthermore, in view of its weight, the loads exerted on its elements during operation, and other factors, it is desirable that a thrust reverser used with such large powerplants be relatively simple and straightforward in design and operation. Finally, a satisfactory thrust reverser should not add significantly to the total aircraft drag during aircraft operation; in particular, the thrust reversing mechanism should not add to the already large diameter of a fan type propulsion unit.

It is, therefore, an object of this invention to provide improved lightweight thrust reversing means.

Another object of this invention is to provide improved thrust reversing means for use with jet propulsion powerplants of the fan type.

A further object is to provide for jet propulsion powerplants of the fan or high bypass ratio type thrust reversing means that is relatively simple and straightforward in both design and operation.

A still further object is to provide for use with large diameter jet propulsion powerplants thrust reversing means that does not increase the overall powerplant diameter.

Yet another object of this invention is to provide lightweight thrust reversing means that is relatively inexpensive to manufacture, install, and maintain.

Briefly stated, in carrying out the invention in one form, a fan type powerplant and thrust reversing assembly is provided for producing and directing a low temperature stream of motive fluid. The assembly includes a powerplant unit having an annular motive fluid passageway defined therein between an outer cylindrical casing and inner structure. An aerodynamically shaped hollow fairing is coaxially mounted with respect to said passageway for axial movement by actuating means between a first upstream position and a second downstream position. In the first position, the fairing forms a downstream continuation of the inner structure; in the second position, the fairing is spaced axially downstream of the inner structure and the exhaust end of the annular passageway. A flexible panel is stowed within the fairing when the fairing is in the first position and is deployed across the motive fluid stream when the fairing is in the second position. As the fairing is moved from the first to the second position, the flexible panel may be withdrawn from the fairing and inflated by the motive fluid being exhausted from the powerplant unit. The flexible panel then assumes a smoothly curved form to deflect the stream of motive fluid from the normal rearward direction to a deflected direction having a substantial forward component, thereby producing reverse thrust. As the fairing is moved from the second to the first position, the flexible panel is automatically retracted into the fairing.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a plan view of an aircraft powered by fan type jet propulsion powerplants;

FIG. 2 is an enlarged view, partially in cross section, illustrating in greater detail the cruise fans of FIG. 1 and illustrating in conjunction therewith the lightweight thrust reversing means of this invention, the hollow fairing being shown in its first position; and FIG. 3 is a view similar to FIG. 2 showing the hollow fairing in its second position and the flexible panel in its deployed thrust reversing position.

Referring first to FIG. 1, an aircraft indicated generally by the numerical 10 is illustrated, the aircraft 10 having an airframe including a fuselage 11, a pair of wings 12, and a tail section 13. A pair of jet propulsion units 14 of the cruise fan type are symmetrically mounted on horizontally opposite sides of the aft portion of the fuselage 11 intermediate the wings 12 and the tail section 13. While the specific configuration and operation of the cruise fans 14 will be explained in detail at a later point in this specification, it will be well to point out at this time that powerplants of the fan type have relatively large diameters and are designed to produce propulsion streams of high mass and density at relatively low velocity. In accordance with the present invention, lightweight thrust reversing means are provided for deflecting the jet streams discharged from the cruise fans 14. The lightweight thrust reversers of this invention, one being provided for each cruise fan 14, are indicated generally by the numeral 15 on FIG. 1.

Before proceeding to a detailed description of the novel and lightweight thrust reversing means 15 of this invention, attention is directed to FIG. 2 where one of the cruise fan powerplants 14 is shown in greater detail. Each cruise fan 14 includes a cylindrical casing 20 and an elongated centerbody 21 concentrically supported within the cylindrical casing 20 by a plurality of radial support struts 22 and 23. The cylindrical casing 20 and the inner structure of the cruise fan 14, including the centerbody 21, cooperate to define therebetween an annular passageway 24 extending axially between an inlet opening 25 and an exhaust opening 26 at opposite ends thereof. The rotor of a single stage fan 27 is rotatably mounted on the centerbody 21 by suitable bearings 28 for rotation about an axis 29. The single stage fan 27 has a compressor portion comprising a plurality of radial compressor blades 35 spanning the annular, motive fluid passageway 24. The outer tips of the compressor blades 35 are joined by a circumferential shroud 36, and a plurality of radial turbine buckets 37 are mounted on the shroud 36 to form a turbine portion extending outwardly of the compressor portion. The turbine buckets 37 project into an annular recess 38 in the casing 20. Communication means is provided for supplying high temperature gas produced by a gas generator 40 to the turbine portion of the single stage fan 27, the communication means including a nozzle box 41 formed in the annular housing 20 and extending around at least a major portion of the periphery of the housing in alignment with the annular recess in the housing. More particularly, the nozzle box 41 includes vanes 42 which direct the combustion products produced by the gas generator to the turbine buckets 37 at the proper direction and at the proper velocity to drive the single stage fan 27. The fan arrangement just described is commonly referred to as being of the "tip turbine" type.

As described in the preceding paragraph, the combustion products directed to the turbine buckets 37 by the nozzle box vanes 42 drive the single stage fan 27. The stream of high temperature combustion products is decelerated as it flows through the turbine buckets 37, its extracted energy being used to drive the fan 27 and thereby accelerate ambient air drawn into the passageway 24 through inlet opening 25. The decelerated stream of combustion products leaving the turbine buckets 37 is discharged from the annular recess 38 into the axial passageway 24. The combustion products and the accelerated air mix in the annular passageway 24 to form a composite stream which is discharged through the exhaust opening 26 as a propulsion jet having high mass and relatively low velocity. Of even greater importance with respect to the present invention, however, is the fact that the composite motive fluid stream discharged from the exhaust nozzle 26 has a relatively low temperature. The reason for this relatively low temperature will be apparent by observing that a relatively large mass of cold bypass air is mixed with a relatively small mass of high temperature combustion products in the axial passageway 24. In practice, the stream of motive fluid discharged from a cruise fan of the tip turbine type will typically have a temperature in the range of 300° F. to 900° F., whereas the temperature of a typical jet stream comprised of combustion products alone will generally be well in excess of 1000° F. This temperature characteristic of cruise fans or, more generally, any high bypass ratio jet propulsion powerplant is quite significant with respect to the present invention since the relatively low temperature of the jet stream is particularly suited for the novel and lightweight thrust reversing arrangement of this invention.

With reference now to FIGS. 2 and 3, the thrust reversing mechanism of the present invention will be described. As illustrated, the centerbody 21 of the inner structure of the propulsion unit terminates immediately upstream of the exhaust opening 26. Support structure indicated generally by the numeral 50 is carried by the centerbody 21, the support structure 50 extending axially downstream of the centerbody 21 and the exhaust opening 26. The support structure 50, which is coaxially mounted with respect to the centerbody 21 and the cylindrical casing 20, has an outer wall 51 which converges in the downstream direction such that the support structure 50 has its maximum diameter at its upstream end where the outer wall 51 is secured to and supported from the centerbody 21 by webs 52. Another set of webs 53 connect the upstream end of the wall 51 and a conduit 54 coaxially mounted therein, the wall 51 and the conduit 54 being connected also by support means 55 at their downstream ends.

Still referring to FIGS. 2 and 3, a hollow fairing 65 is coaxially mounted with respect to the inner structure and the cylindrical casing 20. More particularly, the fairing 65 is supported from the support structure 50 in a manner which will be described presently, actuating means being provided for moving the fairing 65 axially between a first upstream position illustrated by FIG. 2 and a second downstream position illustrated by FIG. 3. In its first position, the fairing 65 surrounds the outerwall 51 of the support structure 50 in spaced relationship thereto and forms an aerodynamically smooth downstream continuation of the centerbody 21. In its second position, the fairing 65 is spaced axially downstream of both the centerbody 21 and the exhaust opening 26.

With respect to the support and actuating arrangement for the fairing 65, a threaded shaft 66 projects axially through the conduit 54. The threaded shaft 66 is supported for rotation at its upstream end by a bearing assembly 67 and may be driven in either direction by a drive motor 68, the shaft 66 and the motor 68 both being supported from the centerbody 21. A threaded member 69 is mounted on the threaded shaft 66, and a sleeve 70 secured to the threaded member 69 extends axially through the open downstream end of the conduit 54 to the downstream end of the fairing 65. Rotation of the threaded shaft 66 by the drive motor 68 causes axial movement of the threaded member 69 along the shaft 66 and hence axial movement of the fairing 65, the direction of movement of the fairing 65 depending, of course, upon the direction of rotation of the shaft 66. In this manner, the fairing 65 may be moved between its first or upstream position, which is fixed by abutment between the upstream end of the fairing 65 and the downstream end of the centerbody 21 at 71, and its second or downstream position, which is fixed by abutment between the threaded member 69 and a stop member 72 carried by the conduit 54.

In accordance with the present invention, a flexible panel 75 is provided for turning the motive fluid stream produced by the propulsion unit when the fairing 65 is in its second position. When the fairing 65 is in its first position, however, the panel 75 is stored in the space between the outer wall 51 and the fairing 65, the panel therefore having no effect on the motive fluid stream. The manner in which the flexible panel 75 is stored and deployed will now be described. From FIGS. 2 and 3, it will be seen that a first unison ring 76 is secured to the threaded member 69 and that a second unison ring 77 surrounds the conduit 54. These unison rings 76 and 77 are connected by means of a plurality of cables 79 passing through openings 80 and 80a in the support means 55 and over pulleys 81 supported from the downstream end of the conduit 54. A plurality of cables or shroud lines 82 interconnect the second unison ring 77 and peripheral portions of the flexible panel 75, the shroud lines 82 passing over a smoothly rounded leading edge of the outer wall 51 and through openings 83 and 84 in the webs 52 and 53, respectively. The flexible panel 75 is secured at a central portion thereof to the downstream end of the outer wall 51.

Assuming now that the fairing 65 is in its first position as illustrated by FIG. 2, it will be clear that the stream of motive fluid flowing through the annular passageway 24 will produce forward thrust on the aircraft since the flexible panel 75 has no effect on the motive fluid stream. If, however, the fairing 65 is moved to its second position by the drive motor 68 and the threaded shaft 66, it will be seen that the panel 75 in the space between the outer wall 51 and the fairing 65 will be uncovered. At the same time, the unison ring 76 will be moved downstream with the threaded member 69 and thereby permit the unison ring 77 to move upstream. This will release the shroud lines 82 and thus permit the flexible panel 75 to move out into the normal path of an unobstructed fluid stream discharged through the exhaust opening 26. The stream of fluid impinging on the panel 75 will cause it to inflate immediately to form a smoothly curved surface. As determined by design considerations for any particular powerplant arrangement, the flexible panel 75 has a certain amount of slack when the fairing 65 is in its second position, the slack being of an amount sufficient to permit the flexible panel 75 to form a smoothly curved wall or turning surface when a composite motive fluid stream is being discharged through the exhaust opening 26 so as to impinge thereon. In this manner, the flexible panel 75 provides a smoothly curved thrust reversing surface for deflecting the stream from its normal rearwardly directed path to a new direction having substantial forward components, for producing reverse thrust, the new direction being illustrated by the arrows of FIG. 3. To assure that the panel 75 moves into the motive fluid stream when the fairing is moved to its second position, compressed air from the gas generator 40 can be supplied through a conduit 90. A jet of the compressed air will force a portion of the panel 75 into the motive fluid stream, and the force of the stream acting thereon will quickly inflate the panel.

As pointed out above, a stream of composite motive fluid exhausted from the exhaust opening 26 of the propulsion unit has a relatively low temperature. Because of this, it is possible to use the simple and light-weight flexible panel 75 for deflecting the stream. In practice, the panel 75 may be fabricated from a broad range of flexible materials, including various fabrics. There are, however, several lightweight, strong, and durable materials which have particular utility for such use, these including fiberglass cloth, certain high temperature plastic materials, and woven metal cloth. Other suitable lightweight materials will, of course, also occur to those skilled in the art.

When it is desired to retract the flexible panel 75, the fairing 65 is moved forward to its first position. As it moves, its smoothly rounded leading edge forces the panel 75 into the space between the outer wall 51 and the fairing 65. At the same time, the unison ring 76 is moved upstream and the unison ring 77 is moved downstream so as to retract the shroud lines 82 and thus pull the peripheral portions of the panel 75 into the space.

In the embodiment described above, the fairing 65 is moved between its first and second positions by means of a screw jack type of actuating mechanism. It will occur to those skilled in the art that other actuating mechanisms may be devised to perform this function. Also, while a cruise fan 14 of the tip turbine type mounted on the fuselage has been illustrated and described by way of example, it will be obvious that the thrust reversing arrangement may be used with wing mounted powerplants and that other arrangements of turbo-machinery could be used. For example, a fan assembly could be used for propelling the aircraft in which the compressor blades are mounted on the outer tips of the turbine buckets. Similarly, a geared or turbine driven fan arrangement in which no hot gases enter the main stream that is deflected by the novel thrust reversing means of this invention could be used to propel the aircraft. To use lightweight flexible panels for thrust reversing, it is preferable that the motive fluid stream used for propulsion be of relatively low temperature. It is, of course, understood that the term "low" is relative to normal temperatures associated with jet propulsion powerplants. In this respect, temperatures in the range of 400° F. to 900° F. are considered to be relatively low. In view of the foregoing, it will occur to those skilled in the art that the novel thrust reverser of this invention may be used in conjunction with turbojet engines having low temperature exhaust gases as well as with turbofan engines.

From the foregoing it will be appreciated that the lightweight thrust reversing means of this invention is particularly suited for use with jet propulsion powerplants having a low temperature motive fluid stream. Furthermore, the lightweight thrust reverser described above is relatively simple and straightforward in design and operation, and it does not increase either the overall powerplant diameter or aircraft drag during aircraft operation.

While particular embodiments of the invention have been shown and described, it will be understood that various changes and modifications may be made without departing from the spirit and scope of the invention and it is intended to cover all such changes and modifications by the appended claims.

What is claimed as new and is desired to secure by Letters Patent of the United States is:

1. In a jet propelled aircraft, a fan type powerplant and thrust reversing assembly for producing and directing a low temperature stream of motive fluid, said assembly comprising:

a fan type powerplant unit comprising an outer cylindrical casing and inner structure coaxially mounted within said casing to define therebetween an annular motive fluid passageway extending axially between an inlet opening and an exhaust opening at the upstream and downstream ends, respectively, of said casing and said inner structure, support means carried by said inner structure and extending axially downstream therefrom, a hollow fairing coaxially mounted with respect to said casing and said inner structure and having an aerodynamic shape converging in the downstream direction, said hollow fairing being axially movable between first and second operative positions, said fairing in said first position surrounding said support means in spaced relationship thereto and forming an aerodynamically smooth downstream continuation of said inner structure and said fairing in said second position being spaced axially downstream of said inner structure and the exhaust opening, actuating means for moving said fairing between said first and second positions, a flexible panel secured at a central portion thereof to the downstream end of said support means, and interconnecting means between peripheral portions of said flexible panel and said actuating means for retracting said flexible panel into the space between said fairing and said support means as said fairing is moved to said first position and for permitting said flexible panel to be withdrawn from within said fairing as said fairing is moved to said second position, said flexible panel forming a smoothly curved surface extending across the normal path of an unobstructed motive fluid stream when said fairing is in said second position and a stream of motive fluid is being discharged so as to impinge on and inflate said panel, the smoothly curved surface deflecting the stream of motive fluid from the normal rearward direction to a deflected direction to thereby produce reverse thrust.

2. A powerplant and thrust reversing assembly as defined by claim 1 in which said actuating means comprises:

a threaded shaft mounted for rotation in said support means, said shaft being axially disposed with respect to said casing and said inner structure, drive means for reversibly rotating said threaded shaft, and a threaded member mounted on said threaded shaft for axial movement thereon in response to rotation of said shaft, said threaded member connected to said fairing such that rotation of said threaded shaft causes axial movement of said fairing.

3. A powerplant and thrust reversing assembly as defined by claim 2 in which said interconnecting means comprises:
 a plurality of cables interconnecting said threaded member and peripheral portions of said flexible panel,
 and a plurality of guide means for guiding said plurality of cables.

4. A powerplant and thrust reversing assembly as defined by claim 3 including means for ejecting said flexible panel from within said fairing as said fairing is moved from said first position to said second position.

5. In a jet propelled aircraft, a powerplant and thrust reversing assembly for producing and directing a low temperature stream of motive fluid, said assembly comprising:
 a substantially cylindrical casing and inner structure coaxially supported within said casing to define therebetween an annular motive fluid passageway extending axially between an inlet opening and an exhaust opening at the upstream and downstream ends, respectively, of said casing and said inner structure,
 a hollow fairing coaxially mounted with respect to said casing and said inner structure and being axially movable between first and second operative positions,
 said fairing in said first position forming a continuation of said inner structure and in said second position being spaced axially downstream of said inner structure and the exhaust opening,
 actuating means for moving said fairing between said first and said second positions,
 a flexible panel carried from said inner structure,
 and interconnecting means between said flexible panel and said actuating means for retracting said flexible panel into the hollow interior of said fairing as said fairing is moved to said first position and for permitting said flexible panel to be withdrawn from the hollow interior as said fairing is moved to said second position,
 said flexible panel forming a surface extending across the normal path of an unobstructed motive fluid stream when said fairing is in said second position and a stream of motive fluid is being discharged so as to impinge on and inflate said panel, the surface deflecting the stream of motive fluid from the normal rearward direction to a deflected direction to thereby produce reverse thrust.

References Cited by the Examiner

UNITED STATES PATENTS

| | | | |
|---|---|---|---|
| 2,421,870 | 6/1947 | Dornier et al. | 244—113 |
| 2,729,409 | 1/1956 | Hand | 244—113 |
| 2,803,944 | 8/1957 | Kroon | 239—265.19 |
| 2,936,582 | 5/1960 | Davidson | 244—113 X |
| 2,960,291 | 11/1960 | Patterson | 244—113 |
| 2,963,272 | 4/1960 | Sinclair | 253—77 |

FOREIGN PATENTS

| | | |
|---|---|---|
| 765,582 | 1/1957 | Great Britain. |

CARLTON R. CROYLE, *Primary Examiner.*